(12) United States Patent
Wiley et al.

(10) Patent No.: US 8,977,098 B2
(45) Date of Patent: Mar. 10, 2015

(54) LIQUID METAL CLAMP AND FIBER CLEAVING USING SAME

(75) Inventors: Robert G. Wiley, Franklin, TN (US);
Brett Clark, Whites Creek, TN (US);
Jared Meitzler, Spring Hill, TN (US);
Jeremy Dawkins, Brentwood, TN (US)

(73) Assignee: 3SAE Technologies, Inc., Franklin, TN (US)

( * ) Notice: Subject to any disclaimer, the term of this patent is extended or adjusted under 35 U.S.C. 154(b) by 252 days.

(21) Appl. No.: 12/844,572

(22) Filed: Jul. 27, 2010

(65) Prior Publication Data
US 2011/0052135 A1 Mar. 3, 2011

Related U.S. Application Data

(60) Provisional application No. 61/228,814, filed on Jul. 27, 2009.

(51) Int. Cl.
*G02B 6/00* (2006.01)
*G02B 6/25* (2006.01)

(52) U.S. Cl.
CPC ........................................ *G02B 6/25* (2013.01)
USPC ............................................ 385/137; 65/174

(58) Field of Classification Search
USPC .................................... 385/137, 147; 65/174
See application file for complete search history.

(56) References Cited

U.S. PATENT DOCUMENTS

| 4,399,541 | A | * | 8/1983 | Kovats et al. | 372/36 |
| 4,488,773 | A | | 12/1984 | Wagner | |
| 4,560,247 | A | * | 12/1985 | Aldebert | 385/124 |
| 4,830,646 | A | * | 5/1989 | Rossberg | 65/407 |
| 5,553,182 | A | * | 9/1996 | Haake | 385/89 |
| 5,842,622 | A | | 12/1998 | Mansfield et al. | |
| 6,634,079 | B1 | | 10/2003 | Kazama | |
| 6,782,183 | B2 | * | 8/2004 | Chiang et al. | 385/137 |

FOREIGN PATENT DOCUMENTS

| CN | 1651955 | 8/2005 |
| JP | 59-65801 | 4/1984 |
| JP | 2003315631 | 11/2003 |

OTHER PUBLICATIONS

International Search Report dated Feb. 25, 2011 issued in corresponding International Application No. PCT/US2010/043408.
Chinese Office Action dated Feb. 13, 2014 issued in corresponding Chinese Application No. 201080037381.0.
Japanese Office action dated Feb. 25, 2014, issued in corresponding Japanese Application No. 2012522972.

* cited by examiner

*Primary Examiner* — Uyen Chau N Le
*Assistant Examiner* — Chad Smith
(74) *Attorney, Agent, or Firm* — Onello & Mello, LLP.

(57) ABSTRACT

The present invention is directed to a liquid metal clamp, and a clamp system and method including same. A clamp system includes a first clamp configured to hold a first portion of a set of fibers and a second clamp configured to hold a second portion of the set of fibers, the second clamp comprising a liquid metal that takes a liquid form at a first temperature for receipt of the second portion of the set of fibers and that takes a solid form at a second temperature to secure the second of the set of fibers. The set of fibers can be a single fiber or a plurality of fibers. The fiber or fibers can have a circular or non-circular cross section.

29 Claims, 7 Drawing Sheets

LIQUID METAL CLAMP AND FIBER CLEAVING USING SAME

CROSS REFERENCE TO RELATED APPLICATIONS

This application claims priority under 35 U.S.C. §119(e) from commonly owned U.S. provisional patent application Ser. No. 61/228,814 filed Jul. 27, 2009, entitled LIQUID METAL CLAMP AND FIBER CLEAVING USING SAME, which is herein incorporated by reference in its entirety.

FIELD OF INTEREST

The present inventive concepts relate to the field of fiber optics, and more particularly to the field of system and methods for preparing and processing optical fibers.

BACKGROUND

In conventional fiber cleavers, a first portion of a fiber is mechanically clamped by a first clamp and then a second portion of the fiber is mechanically clamped by a second clamp. Once both clamps are secured to the fiber, one clamp is selectively moved away (or translated) from the other clamp until a proper amount of tension is applied to the fiber, between the clamps.

Once the proper amount of tension is applied, a surface of the fiber is scored with, for example, an ultrasonic diamond blade. Given the tension, the scoring of the fiber surface causes a crack to propagate through the fiber—achieving a cleave of the fiber.

FIG. 1 is a high level view of a fiber cleaver, in accordance with the prior art. The cleaver is configured to cleave an optical fiber 1, at a stripped portion 2 of the fiber. The cleaver includes a fiber hold down member 3 that sits on a resting table 4. The hold down member 3 holds the un-stripped portion of the fiber.

The stripped portion of the fiber 2 is held by two clamps 5 and 6. A first portion of fiber 2 is positioned in a bottom portion 5b of clamp 5 and then a top portion 5a of clamp 5 is closed to secure the first portion of fiber 2. Fiber 2 is clamped in clamp 6 the same way. That is, a second portion of fiber 2 is positioned in a bottom portion 6b of clamp 6 and then a top portion 6a of clamp 6 is closed to secure the second portion of fiber 2. Clamp 5 can be translated away from clamp 6 to apply a controlled and accurate amount of tension to the fiber 2, between the clamps 5, 6.

Presuming the fiber is tensioned between the two clamps 5 and 6, the stripped portion of the fiber 2 between the clamps 5,6 can be cleaved. A slider 7 includes a hard, sharp blade (e.g., an ultrasonic vibrating diamond blade) that gets placed in contact the with the fiber 2 when the slider is moved in the direction of the fiber, within tracks 9. The blade 8 scores a surface of the fiber and the tension applied to the fiber causes a crack originating at the score to propagate through the fiber, resulting in a cleave.

In an ideal situation, the cleave is perfectly perpendicular to a central axis (and surface) of the fiber. However, the ideal is not practically achievable, largely because clamping with the second clamp causes a small, yet important, torsion to the fiber. The torsion causes the propagation of the crack to be slightly off perpendicular.

When the ends of two fibers being spliced together are not perfectly perpendicular with respect to their surfaces, the imperfect junction of the fibers adversely impacts the transmission properties of the spliced fiber.

The problem of torsion from the second clamp exists with fibers having a circular cross section. This problem is further exacerbated with fibers having other than circular cross sections and multi-strand or bundled fibers.

SUMMARY

In accordance with one aspect of the present disclosure, provided is a clamp system. The system includes a first clamp configured to hold a first portion of a set of fibers and a second clamp configured to hold a second portion of the set of fibers. The second clamp includes a liquid metal that takes a liquid form at a first temperature for receipt of the second portion of the set of fibers and that takes a solid form at a second temperature to secure the second portion of the set of fibers.

The first temperature can be above a state change temperature of the liquid metal and the second temperature can be below the state change temperature.

The system can further comprise a temperature controller arranged to transition the liquid metal to the first temperature.

The temperature controller can include a Peltier heat pump.

The temperature controller can be further arranged to transition the liquid metal to the second temperature.

The system can further comprise a container arranged to contain the liquid metal in the liquid form.

The set of fibers can be vertically oriented and the container can be a bowl.

Alternatively, the set of fibers can be horizontally oriented and the container can be a trough.

The liquid metal can be a metal alloy.

The metal alloy can consist of a Bi—In—Sn fusible alloy, wherein the state change temperature can be about 174° F.

The set of fibers can be a single fiber.

The single fiber can be a large diameter fiber having a diameter of at least 40 μm.

The single fiber can have a non-circular cross section.

The set of fibers can comprise multiple fibers.

The multiple fibers can comprise a center fiber and a plurality of fibers distributed about the center fiber.

The liquid metal can apply a substantially uniform compressive force to the set of fibers.

The liquid metal can take an initial form of an ingot.

In accordance with another aspect of the present invention, provided is a method of clamping a set of fibers. The method comprises clamping a first portion of the set of fibers with a first clamp and clamping a second portion of the set of fibers with a second clamp that is a liquid metal clamp. Clamping the second portion of the set of fibers with a second clamp includes: providing a liquid metal in a liquid form at a first temperature; positioning the second portion of the set of fibers in the liquid metal in the liquid form; and transitioning the liquid metal to a second temperature so that the liquid metal takes a solid form, thereby securing the second portion of the set of fibers.

The first temperature can be above a state change temperature of the liquid metal and the second temperature can be below the state change temperature.

In accordance with another aspect of the invention, provided is a fiber clamp, comprising a liquid metal disposed in a container, wherein the liquid metal takes a liquid form at a first temperature for receipt of a portion of a set of fibers and takes a solid form at a second temperature to secure the portion of the set of fibers.

The clamp can further comprise a temperature controller arranged to transition the liquid metal to the first temperature.

The temperature controller can include a Peltier heat pump.

In accordance with another aspect of the invention, provided is a fiber cleaver. The cleaver includes a first clamp configured to hold a first portion of a set of fibers, a second clamp configured to hold a second portion of the set of fibers, and a blade configured to score the at least one fiber to generate a cleave in the at least one fiber. The second clamp includes a liquid metal that takes a liquid form at a first temperature for receipt of the second portion of the set of fibers and that takes a solid form at a second temperature to secure the second portion of the set of fibers.

The first temperature can be above a state change temperature of the liquid metal and the second temperature can be below the state change temperature.

The clamped set of fibers is maintained with an amount of torsion such that the cleave can be off from perpendicular relative to a surface of the fiber by 0.2 degrees or less.

The system can further include a heat pump arranged to bring the liquid metal to the first temperature.

The heat pump can be configured to bring the liquid metal to the first temperature in response to a first voltage.

The heat pump can be configured to bring the liquid metal to the second temperature in response to a second voltage.

The second voltage can have about the same magnitude as the first voltage, with an opposite polarity.

The first temperature can be about 40° F. higher than the second temperature.

At least one of the first and second clamps can be configured to tension the set of fibers.

The tensioning can be controlled by a controller and the tension can be a predetermined amount of tension for the set of fibers.

The set of fibers can be a single fiber.

The set of fibers can be multiple fibers.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Figure 1:
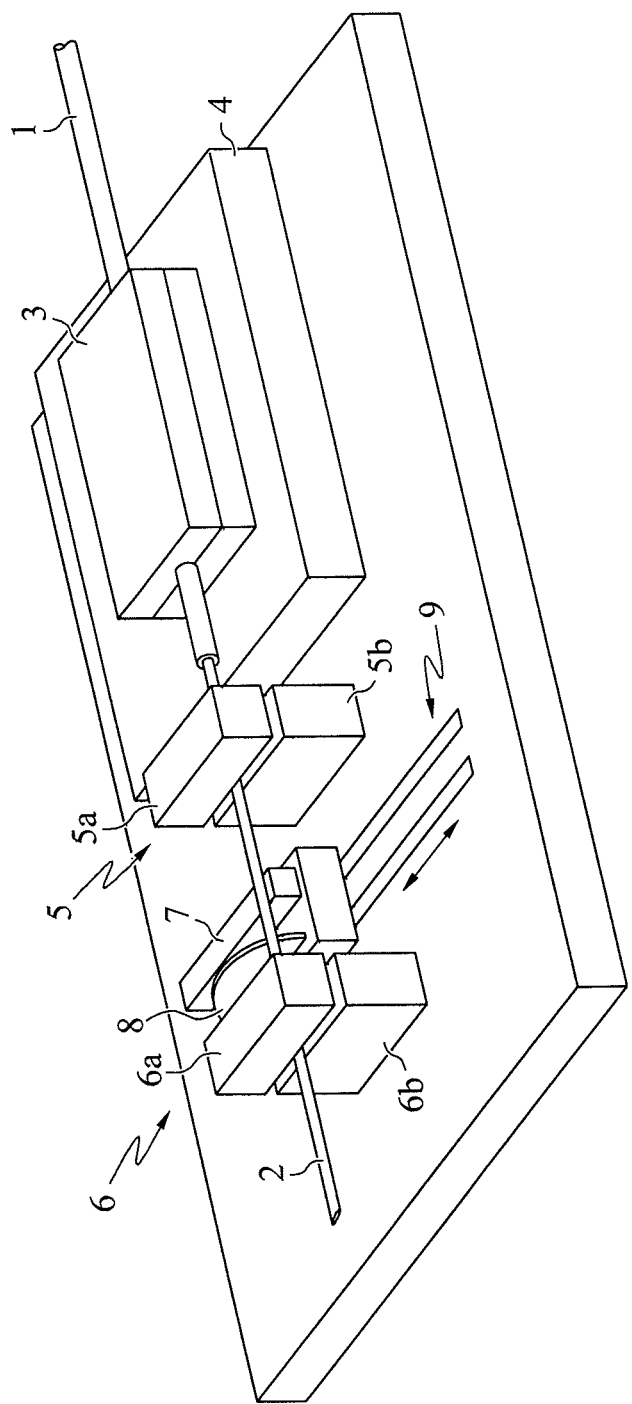
FIG. 1 is a high level view of a fiber cleaver, in accordance with aspects of the present invention.
Figure 2:
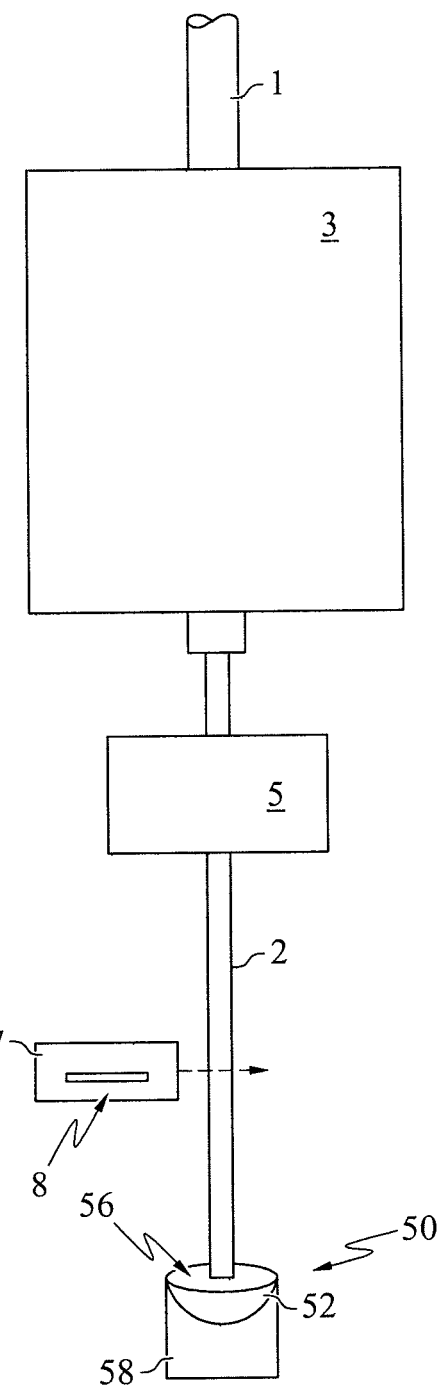
FIG. 2 is a high level view of an embodiment of a fiber cleaver having a liquid metal clamp using a bowl, in accordance with aspects of the present invention.

FIG. 2 is a high level view of an embodiment of a fiber cleaver having a liquid metal clamp using a container in the form of a bowl, in accordance with aspects of the present invention. In the embodiment of FIG. 2, a clamping system uses first clamp 5 described with respect to FIG. 1, along with fiber hold down member 3, slider 7 and blade 8. Repeated description of these elements common to FIG. 1 is omitted here, for purposes of brevity.

In the various embodiments, the fiber 1 can be a single fiber of small or large diameter, e.g., diameters above 40 μm. The fiber 1 can have a circular cross section or a non-circular cross section (e.g., oval). The fiber 1 can be a plurality of fibers, e.g., a ribbon or bundle of fibers. The plurality of fibers can, for example, include a center fiber and a plurality of fibers distributed about the center fiber (in parallel). The fiber or plurality of fibers can be collectively referred to as a "set of fibers." The set of fibers can include any known fiber or plurality of fibers, and those developed hereafter.

Unlike FIG. 1, in FIG. 2 the fiber 1, 2 (or set of fibers) and holding and cleaving elements are vertically oriented so that a second portion of the fiber 2 can be positioned in the liquid metal clamp 50 of this embodiment. Fiber 2 is fiber 1 without the casing or cladding (e.g., stripped). Liquid metal clamp 50 includes a bowl 52 within which a liquid metal 56 is maintained. In this embodiment, the liquid metal 56 can take a liquid form at a first temperature and take a solid form at a second temperature. The first temperature can be above a state change temperature and the second temperature can be below the state change temperature.

A temperature controller 58 can be included and arranged to bring the liquid metal 56 to the first temperature that is above the state change temperature, so that the liquid metal 56 takes a liquid form. When the liquid metal is in the liquid form, a second portion of the fiber is positioned in the liquid metal 56, within bowl 52. The liquid metal is then brought to a second temperature, above the state change temperature, so that it takes a solid form.

The liquid metal can be allowed to cool to reach the second temperature or it can be cooled using a cooling mechanism, e.g., using temperature controller 58 or a cooling mechanism that generates a flow of cool air or a gas (e.g., using a fan). If unassisted cooling is used, the temperature controller can be used to bring the liquid metal just above the state change temperature, e.g., by 10 degrees F. or less, so that it transitions below the state change temperature more quickly. This approach could be used with assisted cooling as well. Ten degrees F. above state change temperature is not, however, a restriction for purposes of the present invention.

In the preferred form, the liquid metal is a Bi—In—Sn fusible alloy, Bi is Bismuth, In is Indium, and Sn is Tin. In this embodiment, the Bi—In—Sn fusible alloy includes 57% Bi, 26% In, and 17% Sn, which has a state change temperature of about 174° F. One advantage of this alloy is that it is free of hazardous materials, making its handing, use, and disposal relatively uncomplicated by special hazardous material requirements and procedures.

Those skilled in the art will appreciate that many other alloys could be used without departing from the spirit and scope of the present invention. For example, the liquid metal could be a Bi—Sn solder alloy, e.g., with 58% Bi and 42% Sn, and a state change temperature of 138° F. As another example, the liquid metal could be a Bi—In—Pb—Sn fusible alloy, e.g., with 59% Bi. 21% In, 18% Pb (Lead), and 12% Sn, and a state change temperature of 136° F. As another example, the liquid metal could be a Bi—Pb—Sn alloy, e.g., with 52.5% Bi, 32.0% Pb, and 15.5% Sn. At the end of this specification are Addendum datasheets providing examples of metal alloys that can be used for the liquid metal clamping, in accordance with the present invention.

In the preferred form, the selection criteria for a metal alloy are:
1. Temperature range suitable for rapid melting and solidification without damage to fibers.
2. Low toxicity (many available alloys contain Cadmium, which is very toxic. Lead is less toxic, but still not preferable).
3. Price (the lower temperature alloys contain Indium, which is expensive and fluctuates in price)
4. Clamping force achieved. The effectiveness of the alloy in holding the fiber against external forces seems to be related to the degree of expansion or contraction on solidification.

The Bi—In—Sn fusible alloy properties presently seem to be the best with regard to the above criteria. But other criteria could lead to a different selection.

There is another class of materials which might be used as the liquid metal, i.e., metals which are liquid at or near room temperature (or even below). These include Gallium and many of its alloys. In this case, it would not be necessary to heat the material to melt it, only to cool it for solidification. Mercury also might be considered, but is undesirable due to its very high toxicity. It is also possible that Mercury would not function well as a clamp, as it is known to exhibit negligible wetting of glass, unlike Gallium which wets glass aggressively or Indium which does so to a lesser degree.

In other embodiments, the liquid metal could include non-metals, such as glues, epoxies, etc. Thus, the term "liquid metal" as used herein can encompass non-metals. In such cases, if the non-metal is initially in a liquid form, the temperature controller could be used to produce either heating or cooling, as required, to bring the non-metal to a solid form.

The temperature controller 58 can be a Peltier heat pump, as an example, which is known in the art. The heat pump can be configured to bring the liquid metal to the first temperature in response to a first voltage. The heat pump can also be configured to bring the liquid metal to the second temperature in response to a second voltage. The second voltage can have about the same magnitude as the first voltage, with an opposite polarity. The first temperature can be about 40° F. higher than the second temperature, in one embodiment.

Figure 3A:
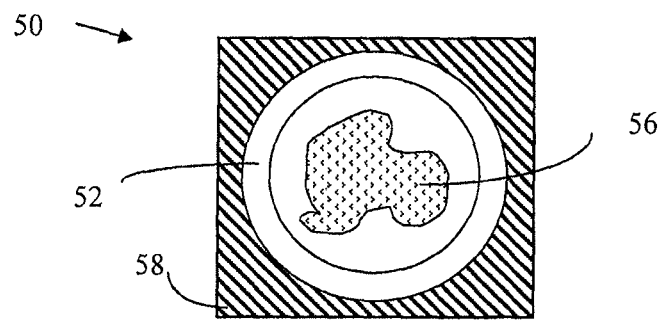
FIGS. 3A and 3B are top views of an embodiment of the liquid metal clamp of FIG. 2 with the liquid metal in different states, in accordance with aspects of the present invention.
Figure 3B:
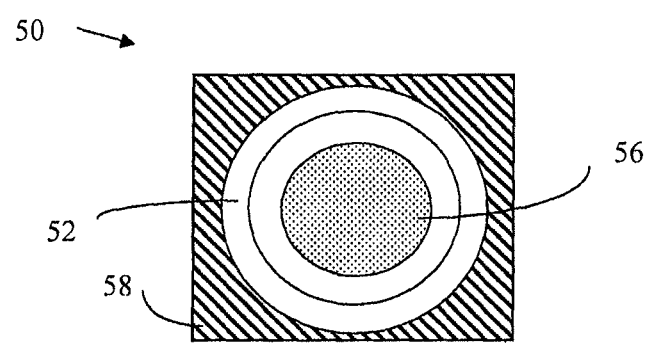

FIGS. 3A and 3B are top views of an embodiment of the liquid metal clamp 50 of FIG. 2 with the liquid metal 56 in different states, in accordance with aspects of the present invention. In FIG. 3A the liquid metal 56 is shown in bowl 52 while in its initial ingot state, as a solid. In this embodiment, the bowl 52 has a volume of about a 1 cm³. In FIG. 3B, the liquid metal 56 is shown in its liquid state, ready for the portion of fiber 2 to be positioned therein. Thereafter, liquid metal 56 is returned to a solid state to clamp the fiber.

For small diameter fibers (e.g. less than 40 μm in diameter), a cleave that is two degrees or less off perpendicular is desirable. For large diameter fibers (e.g. equal to or greater than 40 μm in diameter), a cleave that is half a degree or less off perpendicular is desirable. The clamp achieved by the liquid metal 56 when achieving the solid state provides a fiber-confirming, substantially uniform force clamp—substantially torsion free. As a result, a cleave of a fiber clamped in this way will tend to have a negligible angle relative to a line that is perpendicular to a central axis (or outer surface) of the fiber, e.g., an angle less than about 0.5° and preferably less than about 0.2°. These results can be achieved regardless of the outer shape of the fiber, fiber strip, or fiber bundle, as the case may be.

In this embodiment of a clamp and cleaver, after the cleave, the liquid metal can be returned to liquid form, the fiber portion or end can be removed from the bowl and discarded, and the liquid metal then can be retained for use with another fiber to be cleaved.

Figure 4:
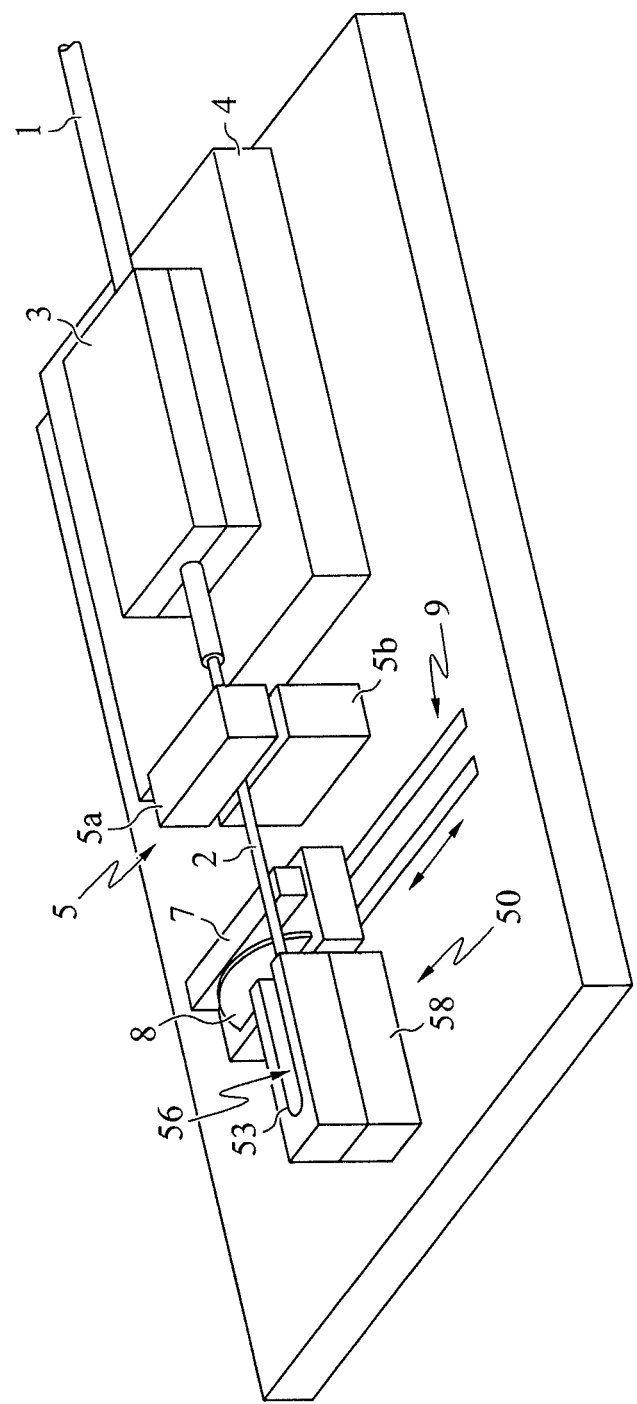
FIG. 4 is a is a high level view of an embodiment of a fiber cleaver having a liquid metal clamp using a trough, in accordance with aspects of the present invention.

FIG. 4 is a is a high level view of an embodiment of a fiber cleaver having a liquid metal clamp using a trough, in accordance with aspects of the present invention. In the embodiment of FIG. 4, a clamping system uses first clamp 5 described with respect to FIG. 1, along with fiber hold down member 3, resting table 4, slider 7 and blade 8. Repeated description of these elements common to FIG. 1 is omitted here, for purposes of brevity.

Unlike FIG. 2, in FIG. 4 the fiber 1, 2 (or set of fibers) and holding and cleaving elements are horizontally oriented so that a second portion of the fiber 2 can be positioned in the liquid metal clamp 50 of this embodiment. Liquid metal clamp 50 includes a trough 53 within which a liquid metal 56 is maintained. As with the embodiment of FIG. 2, the liquid metal 56 takes a liquid form at a first temperature and takes a solid form at a second temperature. The first temperature can be above a state change temperature and the second temperature can be below the state change temperature.

Temperature controller 58 can be included and arranged to bring the liquid metal 56 to the first temperature, so that the liquid metal 56 takes a liquid form. When the liquid metal is in the liquid form, a second portion (or end) of the fiber is positioned in the liquid metal 56, within trough 53. The liquid metal is then brought to a second temperature, so that it takes a solid form.

As above, the clamp achieved by the liquid metal 56 achieving the solid state, which provides a fiber-confirming, substantially uniform force clamp—substantially torsion free. As a result, a cleave of a fiber clamped in this way will tend to have a negligible angle relative to a line that is perpendicular to a central axis (or outer surface) of the fiber, e.g., an angle less than about 0.5° and preferably less than about 0.2°. These results can be achieved regardless of the outer shape of the fiber, fiber strip, or fiber bundle, as the case may be.

In this embodiment of a clamp and cleaver, after the cleave, the liquid metal can be returned to liquid form, the fiber end removed from the bowl and discarded, and the liquid metal then retained for use with another fiber to be cleaved.

Figure 5A:
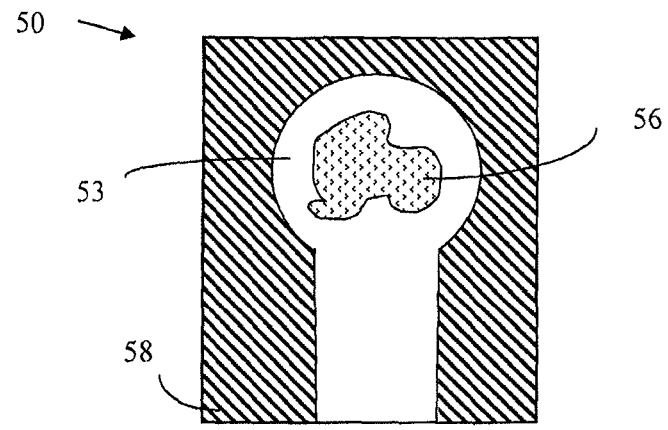
FIGS. 5A and 5B are top views of an embodiment of the liquid metal clamp of FIG. 4 with the liquid metal in different states, in accordance with aspects of the present invention.
Figure 5B:
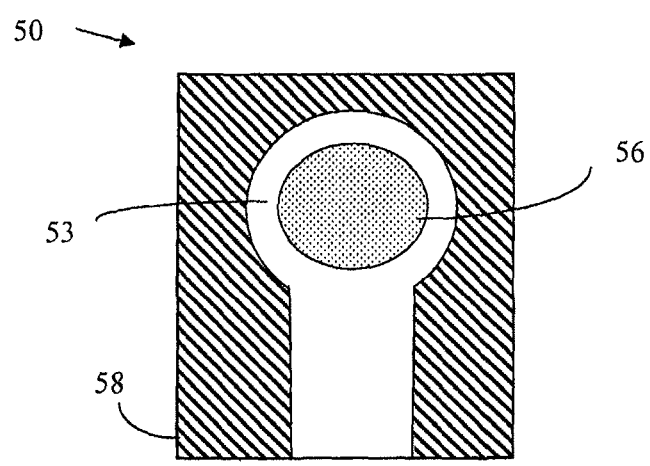

FIGS. 5A and 5B are top views of an embodiment of the liquid metal clamp 50 of FIG. 4 with the liquid metal 56 in different states, in accordance with aspects of the present invention. In FIG. 5A the liquid metal 56 is shown in trough 53 while in its initial ingot state, as a solid. In this embodiment, the trough 53 has a volume of about a 1 cm$^3$. In FIG. 5B, the liquid metal 56 is shown in its liquid state, ready for the portion of fiber 2 to be positioned therein. Thereafter, liquid metal 56 is returned to a solid state to clamp the fiber.

Figure 6:
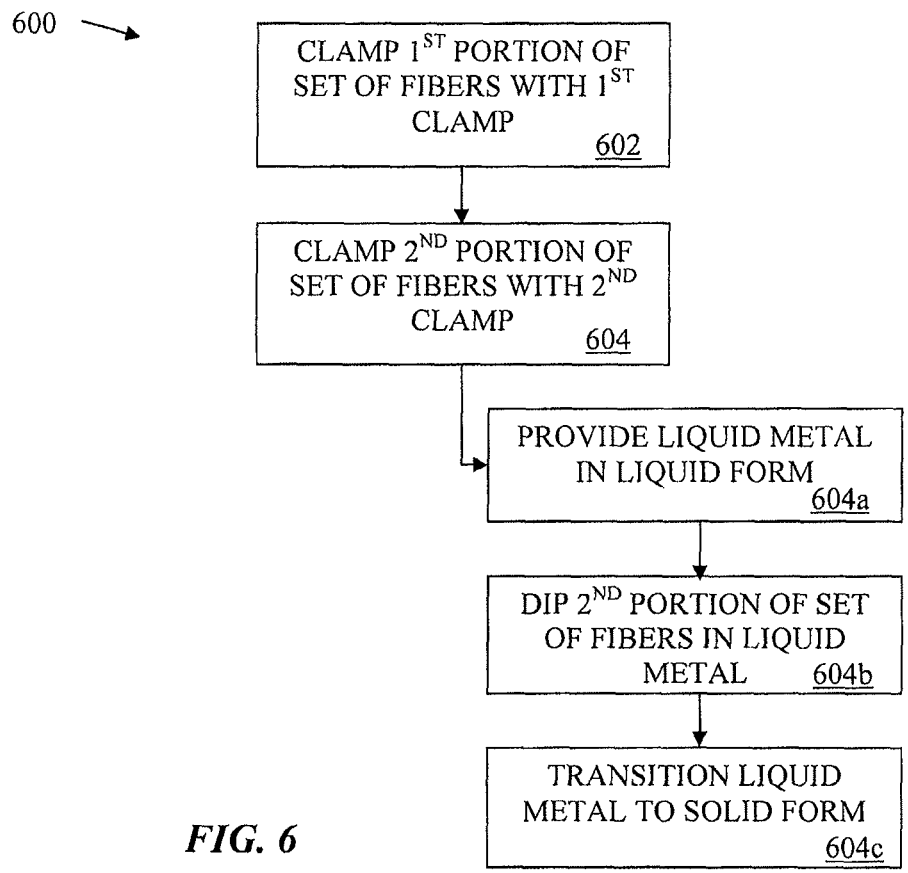
FIG. 6 is a flowchart of an embodiment of a method of clamping a fiber, in accordance with aspects of the present invention.

FIG. 6 is a flowchart of an embodiment of a method of clamping a fiber, in accordance with aspects of the present invention. The method 600 includes clamping a first portion of a set of fibers with a first clamp, in step 602. The method includes clamping a second portion of the set of fibers with a second clamp that is a liquid metal clamp, in step 604. The second portion can be an end of the set of fibers. Step 604 includes providing a liquid metal in a liquid form at a first temperature, in step 604a; positioning a second portion of the set of fibers in the liquid metal in the liquid form, in step 604b; and transitioning the liquid metal to a second temperature so that the liquid metal takes a solid form, thereby securing the second portion of the set of fibers, in step 604c.

Figure 7:
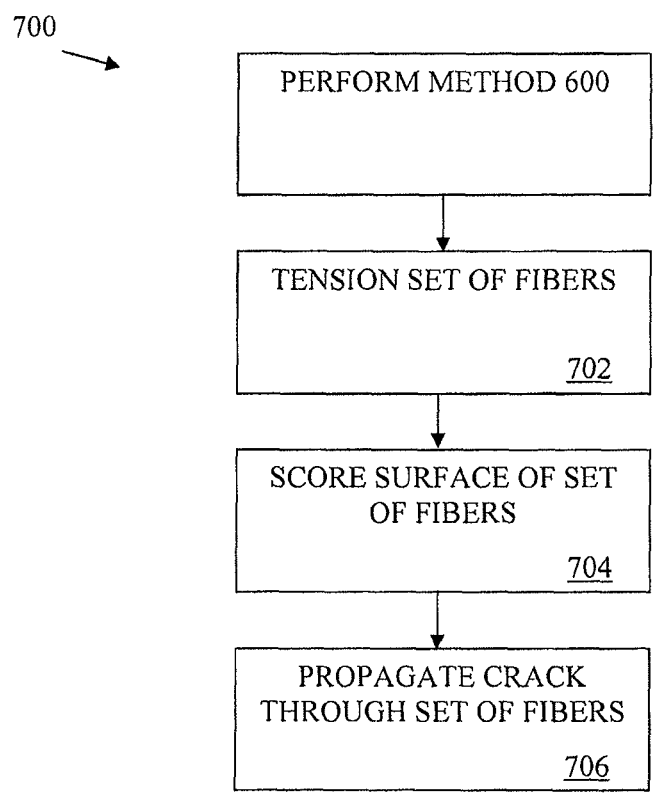
FIG. 7 is a flowchart of an embodiment of a method of cleaving a fiber using a liquid metal clamp, in accordance with aspects of the present invention.

FIG. 7 is a flowchart of an embodiment of a method of cleaving a fiber using a liquid metal clamp, in accordance with aspects of the present invention. Method 700 includes the method 600 of FIG. 6, wherein additional steps are added thereafter. In step 702, a portion of the set of fibers between the clamps is tensioned by translating at least one of the first and second clamps. A surface of the set of fibers is scored, in step 704, causing propagation of a crack through the set of fibers to create a cleave, in step 706.

In some cases, multiple liquid clamps could be used. For example, in the above embodiments the first clamp could also be a liquid clamp.

Those skilled in the art will appreciated that the liquid clamp disclosed herein can have utility beyond that disclosed for fiber cleavers, e.g., for stripping and/or splicing. Depending on the use, the liquid clamp could be the only clamp, where a first clamp is not needed.

Also, while the clamp is referred to as a liquid metal clamp herein, reflecting the presently known best mode, in other embodiments, a "liquid metal" clamp could include substances, materials, or combinations that do not include metals per se, but that serve as suitable equivalents. For example, there may be several non-metals that are liquid at a first temperature and solid at a second temperature that could suffice. Thus, the phrase "liquid metal" is intended to include non-metal equivalents.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

Addendum - Indalloy ® 281 Bi—Sn Solder Alloy
Indium Corp. Indalloy ® 281 Bi—Sn Solder Alloy

| Categories: | Metal; Nonferrous Metal; Bismuth Alloy; Solder/Braze Alloy; Tin Alloy |
| --- | --- |
| Material Notes: | Good low melting point solder for electronics assembly of for applications where Cd and Pb are to be avoided, and for thermo-electric applications. Shear rate sensitive. Information provided by the manufacturer, Indium Corporation. |
| Key Words: | lead free, eutectic solder |
| Vendors: | Click here to view all available suppliers for this material. Please click here if you are a supplier and would like information on how to add your listing to this material. |

|  | Metric | English | Comments |
| --- | --- | --- | --- |
| Physical Properties |  |  |  |
| Density | 8.56 g/cc | 0.309 lb/in* |  |
| Mechanical Properties |  |  |  |
| Tensile Strength, Ultimate | 55.2 MPa | 8010 psi |  |
| Shear Strength | 3.40 MPa | 493 psi | Shear Bond Holding Strength |
| Electrical Properties |  |  |  |
| Electrical Resistivity | 0.0000380 ohm-cm | 0.0000380 ohm-cm |  |

| Addendum - Indalloy ® 281 Bi—Sn Solder Alloy<br>Indium Corp. Indalloy ® 281 Bi—Sn Solder Alloy | | | |
|---|---|---|---|
| Thermal Properties | | | |
| CTE, linear | 15.0 μm/m-° C.<br>@Temperature 20.0° C. | 8.33 μin/in-° F.<br>@Temperature 68.0° F. | |
| Thermal Conductivity | 19.0 W/m-K<br>@Temperature 85.0° C. | 132 BTU-in/hr-ft$^2$-° F.<br>@Temperature 185° F. | |
| Melting Point | 138° C. | 280° F. | Eutectic |
| Solidus | 138° C. | 280° F. | |
| Liquidus | 138° C. | 280° F. | |
| Component Elements Properties | | | |
| Bismuth, Bi | 58.0% | 58.0% | |
| Tin, Sn | 42.0% | 42.0% | |

Some of the values displayed above may have been converted from their original units and/or rounded in order to display the information in a consistant format. Users requiring more precise data for scientific or engineering calculations can click on the property value to see the original value as well as raw conversions to equivalent units. We advise that you only use the original value or one of its raw conversions in your calculations to minimize rounding error. We also ask that you refer to MatWeb's disclaimer and terms of use regarding this information. Click here to view all the property values for this datasheet as they were originally entered into MatWeb.

| Addendum - Indium Corp. Indalloy ® 174 Bi—In—Sn Fusible Alloy<br>Indium Corp. Indalloy ® 174 Bi—In—Sn Fusible Alloy | |
|---|---|
| Categories: | Metal; Nonferrous Metal; Bismuth Alloy; Indium Alloy |
| Material Notes: | Environmentally safe fusible alloy.<br>Contains no lead or cadmium.<br>Information provided by the manufacturer,<br>Indium Corporation. |
| Vendors: | Click here to view all available suppliers for this material.<br>Please click here if you are a supplier and would like information on how to add your listing to this material. |

| | Metric | English | Comments |
|---|---|---|---|
| Physical Properties | | | |
| Density | 8.54 g/cc | 0.309 lb/in* | |

| Addendum - Indium Corp. Indalloy ® 174 Bi—In—Sn Fusible Alloy<br>Indium Corp. Indalloy ® 174 Bi—In—Sn Fusible Alloy | | | |
|---|---|---|---|
| Thermal Properties | | | |
| Melting Point | 79.0° C. | 174° F. | Eutectic |
| Solidus | 79.0° C. | 174° F. | |
| Liquidus | 79.0° C. | 174° F. | |
| Component Elements Properties | | | |
| Bismuth, Bi | 57.0% | 57.0% | |
| Indium, In | 26.0% | 26.0% | |
| Tin, Sn | 17.0% | 17.0% | |

Some of the values displayed above may have been converted from their original units and/or rounded in order to display the information in a consistant format. Users requiring more precise data for scientific or engineering calculations can click on the property value to see the original value as well as raw conversions to equivalent units. We advise that you only use the original value or one of its raw conversions in your calculations to minimize rounding error. We also ask that you refer to MatWeb's disclaimer and terms of use regarding this information. Click here to view all the property values for this datasheet as they were originally entered into MatWeb.

| Addendum - Indalloy ® 136 Bi—In—Pb—Sn Fusible Alloy<br>Indium Corp. Indalloy ® 136 Bi—In—Pb—Sn Fusible Alloy | |
|---|---|
| Categories: | Metal; Nonferrous Metal; Bismuth Alloy; Indium Alloy; Solder/Braze Alloy |
| Material Notes: | General purpose fusible alloy. Wettability not outstanding. For use as solder. Information provided by the manufacturer, Indium Corporation. |
| Vendors: | Click here to view all available suppliers for this material.<br>Please click here if you are a supplier and would like information on how to add your listing to this material. |

| | Metric | English | Comments |
|---|---|---|---|
| Physical Properties | | | |
| Density | 9.01 g/cc | 0.326 lb/in* | |
| Mechanical Properties | | | |
| Tensile Strength, Ultimate | 43.4 MPa | 6290 psi | |
| Electrical Properties | | | |
| Electrical Resistivity | 0.0000710 ohm-cm | 0.0000710 ohm-cm | |
| Thermal Properties | | | |
| CTE, linear | 23.0 μm/m-° C.<br>@Temperature 20.0° C. | 12.8 μin/in-° F.<br>@Temperature 68.0° F. | |
| Thermal Conductivity | 10.0 W/m-K<br>@Temperature 85.0° C. | 69.4 BTU-in/hr-ft$^2$-° F.<br>@Temperature 185° F. | |
| Melting Point | 58.0° C. | 136° F. | Eutectic |
| Solidus | 58.0° C. | 136° F. | |
| Liquidus | 58.0° C. | 136° F. | |

| Addendum - Indalloy ® 136 Bi—In—Pb—Sn Fusible Alloy | | |
|---|---|---|
| Indium Corp. Indalloy ® 136 Bi—In—Pb—Sn Fusible Alloy | | |
| Component Elements Properties | | |
| Bismuth, Bi | 49.0% | 49.0% |
| Indium, In | 21.0% | 21.0% |
| Lead, Pb | 18.0% | 18.0% |
| Tin, Sn | 12.0% | 12.0% |

Some of the values displayed above may have been converted from their original units and/or rounded in order to display the information in a consistant format. Users requiring more precise data for scientific or engineering calculations can click on the property value to see the original value as well as raw conversions to equivalent units. We advise that you only use the original value or one of its raw conversions in your calculations to minimize rounding error. We also ask that you refer to MatWeb's disclaimer and terms of use regarding this information. Click here to view all the property values for this datasheet as they were originally entered into MatWeb.

What is claimed is:

1. A fiber cleaver system with liquid metal clamp, comprising:
    a first clamp spaced apart from a second clamp and collectively arranged to clamp a length of a set of fibers extending in an axial direction, wherein:
        the first clamp is configured to clamp an intermediate portion of the set of fibers; and
        the second clamp comprises a container configured to receive and clamp an endface of the set of fibers and to maintain a liquid metal that takes a liquid form at a first temperature for receipt of the endface and takes a solid form at a second temperature to clamp the endface such that the clamp achieved when in the solid form is a substantially uniform force clamp that is substantially torsion free; and
    a blade configured to score the tensioned set of fibers between the first and second clamps to generate a substantially perpendicular cleave in the set of fibers.

2. The system of claim 1, further comprising:
    a temperature controller arranged to transition the liquid metal to the first temperature.

3. The system of claim 2, wherein the temperature controller includes a Peltier heat pump.

4. The system of claim 2, wherein the temperature controller is further arranged to transition the liquid metal to the second temperature.

5. The system of claim 1, wherein the set of fibers is vertically oriented along its axial direction and the container is a bowl.

6. The system of claim 1, wherein the set of fibers is horizontally oriented along its axial direction and the container is a trough.

7. The system of claim 1, wherein the liquid metal is a metal alloy.

8. The system of claim 7, wherein the metal alloy consists of a Bi—In—Sn fusible alloy.

9. The system of claim 7, wherein a state change temperature for changing the metal alloy from a solid to a liquid is a temperature in a range of 136° F. to 280° F.

10. The system of claim 1, wherein the set of fibers is a single fiber.

11. The system of claim 10, wherein the fiber is a large diameter fiber having a diameter of at least 40 μm.

12. The system of claim 10, wherein the fiber has a noncircular cross section.

13. The system of claim 1, wherein the set of fibers comprises multiple fibers.

14. The system of claim 13, wherein the multiple fibers comprises a center fiber and a plurality of fibers distributed around the center fiber in a bundle.

15. The system of claim 1, wherein the liquid metal takes an initial form of an ingot.

16. The system of claim 1, wherein the substantially perpendicular cleave is off from perpendicular relative to a surface or axis of the fiber by 0.2 degrees or less.

17. The system of claim 1, further comprising a heat pump arranged to bring the liquid metal to the first temperature.

18. The system of claim 17, wherein the heat pump is configured to bring the liquid metal to the first temperature in response to a first voltage.

19. The system of claim 18, wherein the heat pump is configured to bring the liquid metal to the second temperature in response to a second voltage.

20. The system of claim 19, wherein the second voltage is about the same magnitude as the first voltage, with an opposite polarity.

21. The system of claim 20, wherein the first temperature is about 40° F. higher than the second temperature.

22. A method of cleaving a set of fibers, including:
    clamping an intermediate portion of the set of fibers with a first clamp; and
    after clamping the intermediate portion of the set of fibers, clamping an endface of the set of fibers with a second clamp that is linearly spaced apart from the first clamp so a length of the set of fibers between the first and second clamps extends in an axial direction, including:
        receiving the endface in a container of the second clamp and providing a liquid metal in a liquid state in the container that encompasses the endface; and
        transitioning the liquid metal to a solid state, thereby clamping the endface of the set of fibers with the second clamp such that the clamp achieved when in the solid state is a substantially uniform force clamp that is substantially torsion free; and
    scoring a surface of the set of fibers between the first and second clamps to generate a substantially perpendicular cleave in the set of fibers.

23. The method of claim 22, wherein:
    providing the liquid metal in the liquid state in the container includes heating the liquid metal in an initial solid state within the container; and
    transitioning the liquid metal to the solid state includes cooling the liquid metal in the liquid state within the container.

24. The method of claim 22, wherein
    the substantially perpendicular cleave is off from perpendicular relative to a surface or axis of the fiber by 0.2 degrees or less.

25. The method of claim 22, wherein the set of fibers is a single fiber.

26. The method of claim 25, wherein the single fiber is a large diameter fiber having a diameter of at least 40 μm.

27. The method of claim 22, wherein the set of fibers includes at least one fiber that has a non-circular cross section.

28. The method of claim 22, wherein the set of fibers comprises multiple fibers.

29. The method of claim 27, wherein the multiple fibers comprises a center fiber and a plurality of fibers distributed around the center fiber in a bundle.

* * * * *